United States Patent [19]
Cook

[11] 3,980,349
[45] Sept. 14, 1976

[54] ANTI-SKID BRAKE CONTROL SYSTEM

[75] Inventor: Robert D. Cook, Newhall, Calif.

[73] Assignee: Crane Co., Chicago, Ill.

[22] Filed: Jan. 13, 1975

[21] Appl. No.: 540,409

Related U.S. Application Data
[62] Division of Ser. No. 68,433, Aug. 31, 1970.

[52] U.S. Cl. ............................... 303/21 BE; 303/20
[51] Int. Cl.² .......................................... B60T 8/08
[58] Field of Search.................... 188/181; 244/111; 303/20, 21; 307/10 R; 317/5; 324/161–162; 340/52, 63

[56] References Cited
UNITED STATES PATENTS

| | | | |
|---|---|---|---|
| 3,584,921 | 6/1971 | Crawford | 303/21 BE |
| 3,612,622 | 10/1971 | Riordan | 303/21 P |
| 3,650,575 | 3/1972 | Okamoto | 303/20 X |
| 3,710,186 | 1/1973 | Sharp | 317/5 |

Primary Examiner—Stephen G. Kunin
Attorney, Agent, or Firm—Henry L. Brinks

[57] ABSTRACT

An anti-skid braking system for an automobile including apparatus for sensing rotational wheel speed, reference comparison apparatus for developing a signal indicating excessive rotational deceleration incident to incipient or actual skidding of the wheel for effecting brake relaxation and reference control apparatus for controlling the reapplication of braking effort.

10 Claims, 7 Drawing Figures

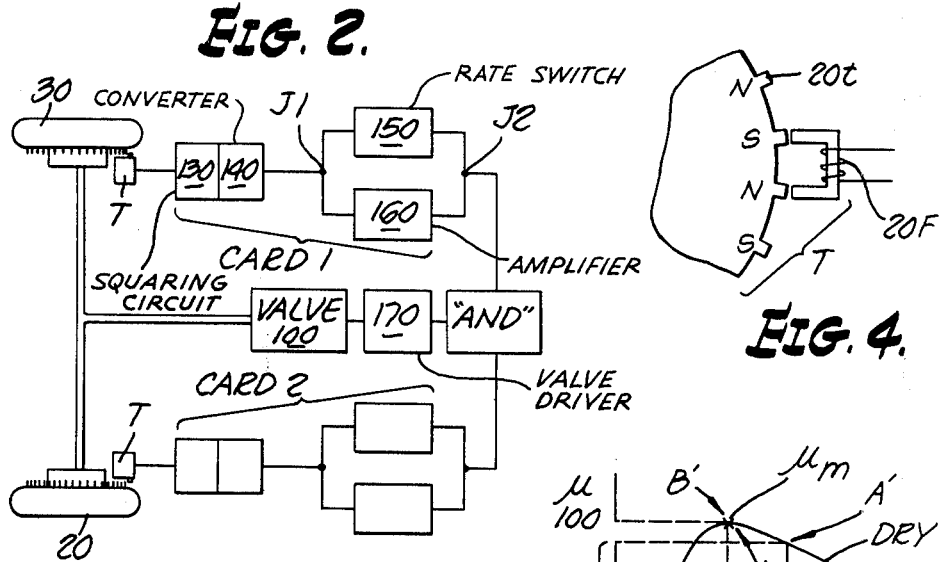
FIG. 2.
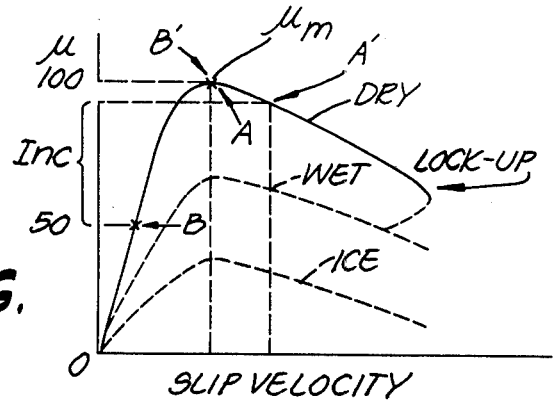
FIG. 4.
FIG. 6.
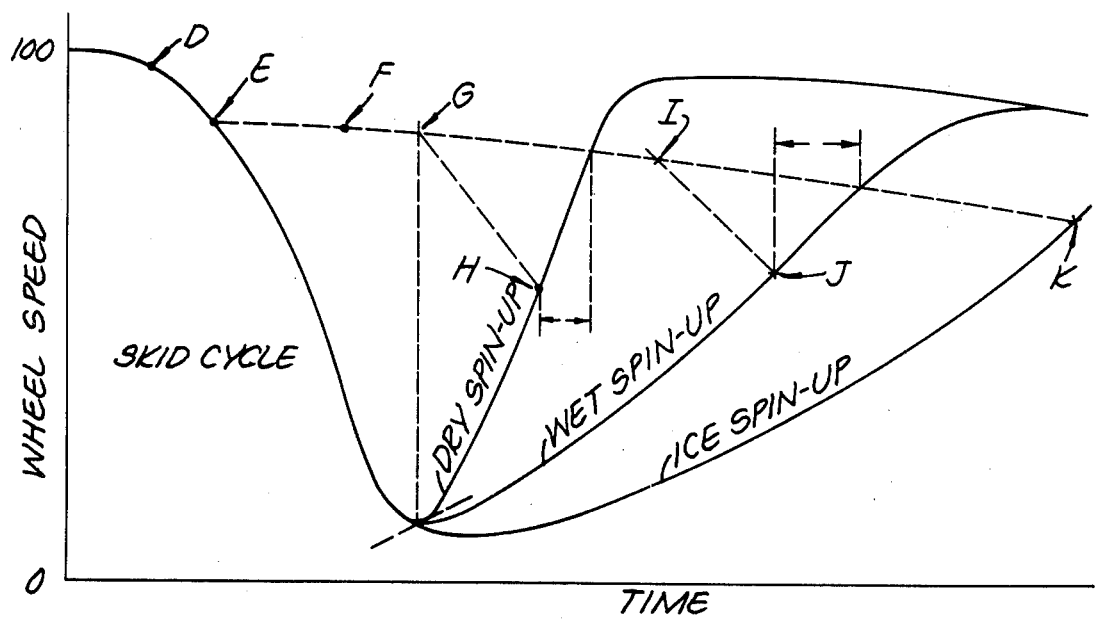
FIG. 7.

ANTI-SKID BRAKE CONTROL SYSTEM

This application is a division of Ser. No. 68,433 filed Aug. 31, 1970.

In the prior art automobile braking systems it is known to utilize at the rear wheels, respective wheel speed sensors, and to use electronic circuit means connected to the sensors and so devised that a brake control signal is produced when either one of the wheels decelerates excessively indicating skidding, and to use means such as an electromagnetically-operated relief valve to reduce application of pressure to the brakes of the two wheels concurrently in response to a brake control signal from the circuit means. Such systems reduce braking effort at both rear wheels when either reaches the skidding stage, even if the other wheel of the pair is not braking heavily, is not closely approaching the skidding condition, and is urgently needed to produce braking effort.

To obviate the aforementioned and other shortcomings of prior braking systems, the present invention utilizes first and second wheel speed transducers, one at each rear wheel, first and second electronic circuit means each connected to a respective transducer and each productive of a respective output signal when the associated wheel reaches incipient or actual skidding. Thus an output signal is not produced until the associated wheel has reached the point of exerting maximum braking effort. A logical AND means is interposed between the two electronic circuit means and the brake relieving means requiring both rear wheels to reach the point of maximum braking effort (incipient skidding) before a signal is translated to the brake relieving means. In exemplary form the logical AND means is an electronic logical ANd circuit which serves to nullify or prevent either of the first or second electronic circuits from creating an effective brake control signal until the other circuit also produces a signal indicative of incipient or actual skidding at that wheel. The brake relieving means comprises an electrically controlled valve interposed in the fluid line leading from the master brake cylinder or the like, to the wheel brake cylinders. A special quick-acting valve device is employed to enhance the described action. The electronic circuit means functions to sense the condition of the roadway surface and to regulate decay of the brake relieving control signal in accordance with the surface condition. In this manner, re-application of the brakes is quickly effected following incipient or actual skidding of both wheels if the roadway surface is dry, but is delayed appropriately if the surface is wet, and still further delayed if the roadway is icy.

It is therefore an object of the invention to provide means for increasing the efficiency of automotive vehicle brake systems. A further object is to provide means for requiring both rear wheels to reach at least the maximum braking effort condition before brake relaxation is initiated incident to incipient or actual skidding. Another object of the invention is to interpose logical AND means between first and second independent rear-wheel skid-detecting circuits and a brake-relieving means whereby both rear wheels must at least pass the point of maximum braking effort before brake relaxation can be initiated.

These and other more specific objects will appear upon reading the following specification and claims and upon considering in connection therewith the attached drawing to which they relate.

Referring now to the drawing in which a preferred embodiment of the invention is illustrated:

FIG. 2 is a schematic diagram showing, principally in block-diagram style, the functional arrangement of principal electrical and electromechanical components associated with the exemplary two rear wheels of the vehicle to which the invention is applied;

FIG. 3 is a cross-sectional view of valve means used in the exemplary embodiment of apparatus according to the invention, with certain components auxiliary to the valve means;

FIG. 4 is a schematic diagram of an exemplary wheel-speed transducer of the proximity detector type, employed in the system of the invention;

FIG. 6 is a graph useful in explaining the operation of the rear wheel brakes with dry, wet and icy pavement conditions; and FIG. 7 is a diagram illustrating sequences of operations of the braking system under various braking conditions.

Figure 1:
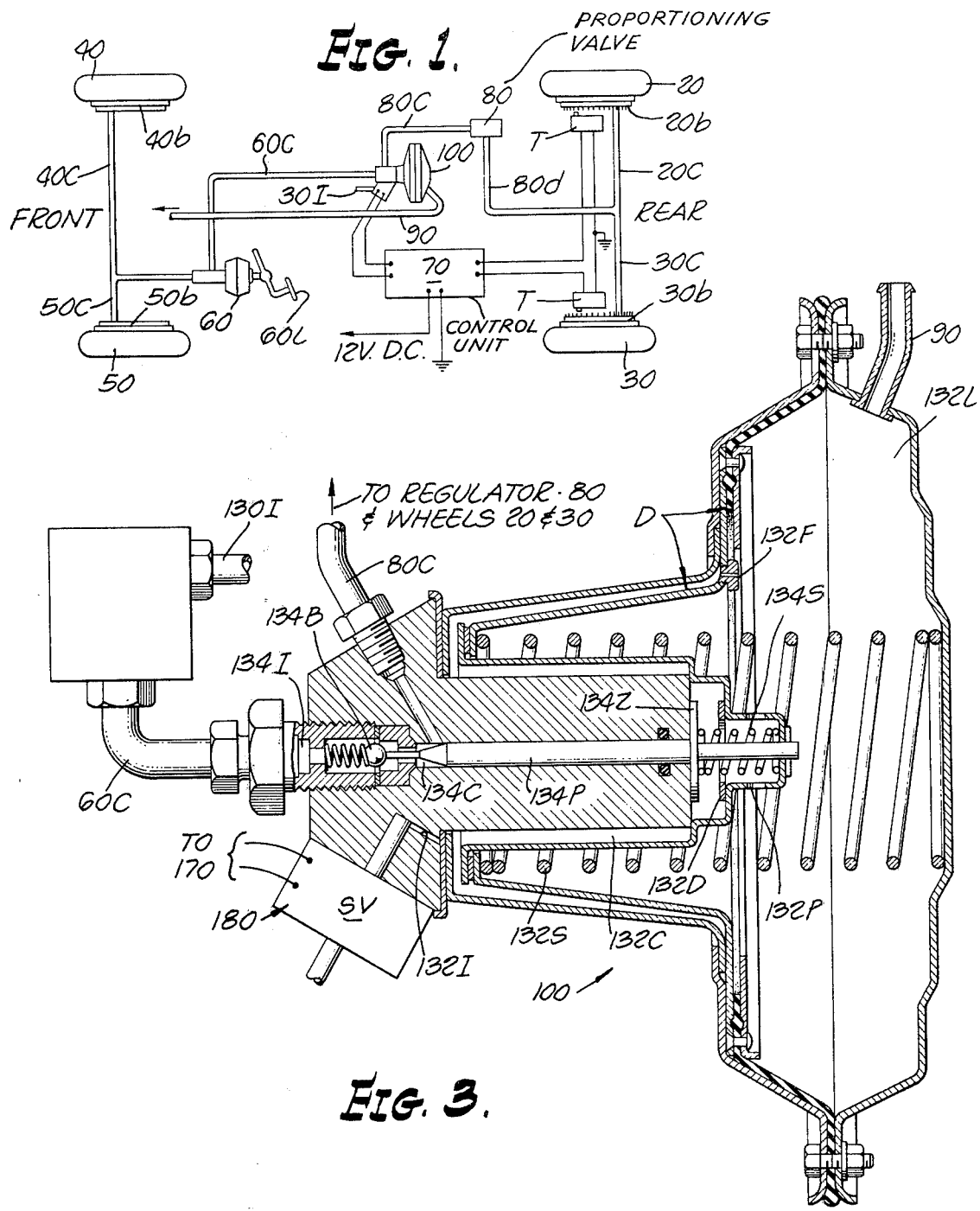
FIG. 1 is a partially schematic diagram showing an exemplary vehicle wheel and wheel brake arrangement, indicating features of hydraulic brake operating means including valve means, and showing in functional diagram form preferred electro-mechanical and electrical means.

In FIG. 1, the rear wheels 20 and 30, and the front wheels 40 and 50, of an exemplary automotive vehicle, are shown. The wheels have associated therewith brake means including brake-applying means and brake-releasing means, indicated generally by 20b, 30b, 40b and 50b, respectively. The brake-applying means are of the hydraulically-actuated type operated by fluid supplied under pressure to front brakes through conduits 40c, 50c and to the rear brakes through conduits 20c, 30c. Fluid is supplied to the forward two conduits 40c and 50c from a differential-pressure-assisted manually-controlled device 60 via conduit 60c. Fluid under pressure is also supplied from device 60 to a special electrically controlled valve device 100 via a conduit 60c and, under control of device 100 is supplied via conduit 80c, proportioning valve or regulator 80 and conduit 80d to the conduits 20c and 30c leading to brake means 20b and 30b.

Device 60 and valve device 100 are supplied operating pressure-differential through conduit 90 connected to a source of suction of sub-atmospheric pressure, such as an engine intake manifold and by a vent to atmosphere, as will be described more fully presently. Device 60 is controlled by an operators lever 60L, such as a conventional vehicle brake-pedal.

The general operation of the described components, with the exception of valve device 100, may correspond closely with known operation of automotive braking means, and is or may be conventional insofar as the front wheels 40 and 50 are concerned. However, the operation relative to rear wheels 20 and 30 is not conventional.

It is known in the prior art to sense the rotational speed of a vehicle wheel to derive a signal representative of the instant rotational deceleration of the wheel, and to utilize the signal to effect relaxation of braking at that wheel incident to rotational deceleration at a rate exceeding a determined value intended to represent actual or incipient skidding of the wheel. By utilizing electronic sensing and governing means, very rapid-acting control means were devised to provide much improved braking capabilities. However, in the prior art systems, in which relaxation of braking occurred simultaneously at all wheels or at both rear wheels, one of the latter could indicate brake relaxation incident to incipient or actual skidding of that wheel while the other was being only moderately braked; and thus maximum braking effort was not generally attained.

In the present invention, the rear wheels are required to attain rotational deceleration rates representing incipient or actual skidding before brake relaxation can be effected, and thus maximum braking effort by the rear wheels is assured. In general, in all automotive braking systems it is customary to so design the components, or to so operate the brakes, that the front-wheel brake means lock-up or cause front wheel skidding prior to occurrence of incipient skidding at a rear wheel, whereby inertia of the vehicle tends to cause the vehicle to maintain a substantially straighforward motion. Thus, in the case of the present invention, the front wheel or wheels of the vehicle, by virtue of the proportions of the parts or by action of such means as regulator 80, will insure lock-up or skid of the front wheels prior to either rear wheel reaching the incipient-skidding stage during a braking operation.

To provide a contemporaneous and instantaneous indication representing incipient skidding of a wheel, respective electronic means are employed in conjunction with a transducer at the wheel. The transducer produces an electric signal whose frequency is directly proportional to the instant or contemporaneous rotational speed of the wheel. The electric signal frequency is converted to an analog voltage proportional to wheel speed by wave translating networks, and therefrom is derived a velocity signal. Spin-down and spin-up rates of the velocity signal are sensed. Upon the incidence of skidding at either rear wheel a respective output or error signal is created.

Deceleration of the velocity signal is compared with a reference and an error signal is produced when deceleration of the velocity signal sufficiently exceeds the reference deceleration. Upon generation of an error signal, reference control means decrease the rate of decline of the reference to control termination of the skid signal. Spin-up rate detection means are provided to modify the action of the reference control means based on wheel acceleration.

The output signal of either wheel is made ineffective to initiate brake-relieving valve action unless and until there is a similar output signal from the other wheel likewise indicative of the incipient or actual skidding of that wheel.

The herein described exemplary rear wheel units, each comprising a wheel, brake, brake-applying and brake-releasing means, transducer means, and appurtenances, include a toothed disc of magnetic material affixed to and rotating with the wheel as well as a fixed permanent magnet core around which is a coil, as indicated in FIG. 4. Therein the exemplary disc 20d rotates with wheel 20, and exemplary core 20e is arranged with its pole faces in close proximity to the circular track or path of disc teeth 20t. Coil 20f is supplied current from a direct-current source and as the disc rotates there is generated in coil 20f an alternating potential wave having a frequency directly proportional to the rotational speed of the disc. Alternatively, the disc may have its teeth permanently magnetized, next-adjacent teeth being of opposite magnetic polarity, and the core may be of soft iron. In either case, rotation of the wheel generates an A.C. electric wave signal in coil 20f having a frequency directly proportional to the rotational speed of the wheel, hereinafter termed wheel speed. The transducer as a whole is herein designated by T.

The left and right rear wheel transducers T, (FIG. 1) are electrically connected to the signal-input terminals of a control unit 70 which is provided with DC power, as by connection to the vehicle battery. The output-signal terminals of the unit 70 are connected to the electrical terminals of valve device 100 by lead and ground connections as shown. When the vehicle is moving and an output signal is produced by unit 70, the valve device 100 acts to relieve or relax the braking of wheels 20 and 30, as will be described presently.

Electronic control unit 100 comprises first and second wheel circuits each connected to the D.C. power supply or battery and to a respective one of transducers T, and both are connected via logical AND circuit means to a common valve-driver or power amplifier having its output connected to valve device 100. The circuitry for one rear wheel and for all that is common to both rear wheels 20 and 30 is portrayed in FIG. 5 and includes, as major circuit arrangements or functional circuits, power supply 110, signal input transducer 120, squaring circuit 130, A.C. to D.C. converter 140, rate-threshold switch 150, rate-controlled velocity amplifier 160, logical AND circuit AND, valve driver amplifier 170, and valve electro-magnet coil 180. Of those components the valve coil, valve driver and logical AND circuit are common to both wheels, while the remaining functional circuits are related to but one of the wheels and are twins of respective circuits not illustrated in detail in FIG. 5 but are shown as a block unit connected to the proximity coil of the other wheel transducer T and to the lower limb of the AND circuit in FIG. 5.

Figure 5:
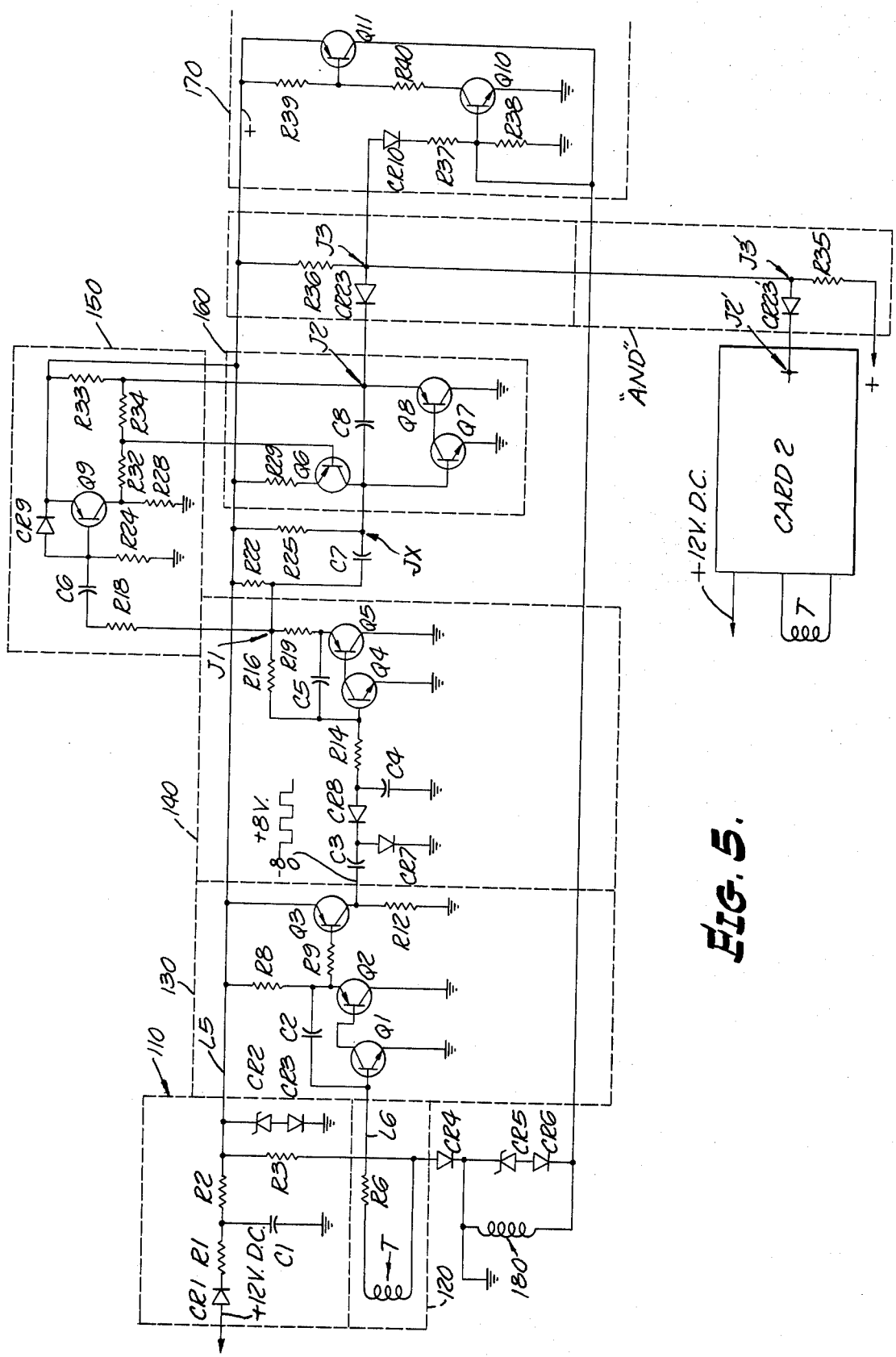
FIG. 5 is an electrical schematic circuit diagram depicting circuit components and connections according to the invention.

Continuing the detailed circuit description and operation with reference to FIG. 5, the conventional power supply unit 110 supplies regulated D.C. power to the following circuits by way of power lead L5 and ground. The winding of transducer T supplies an A.C. component of potential via signal input lead L6 to the wave-squaring circuit comprising transistors Q1 and Q2 and amplifier Q3. The squaring circuit, comprising as well capacitor C2 and resistor R8, provides, in conjunction with the amplifier R9-Q3-R12, provides an 8-volt square wave input to converter 140 via charge transfer capacitor C3. A diode pump circuit consisting of C3, CR7, CR8, C4, R14 converts the square wave frequency to a voltage proportional to wheel speed across C4. This voltage is inverted and amplified by operational amplifier Q4, Q5 to provide a velocity analog voltage at junction J1 that increases with increasing wheel speed and decreases with decreasing wheel speed.

The velocity potential at J1 is supplied to two branches, one being via resistor R18 and capacitor C6 to the base of transistor Q9, which serves as a spin-up rate switch governing the action of the rate controlled velocity amplifier unit 160. The potential at J1 is also supplied via capacitor C7 and a junction JX to the base of rate controlled velocity amplifier transistor Q7, Q8 which senses spin-down rate of the velocity voltage of J1.

During normal wheel rotation and wheel deceleration, transistor Q9 is maintained in saturation; and as a consequence reference control transistor Q6 of unit 160 is biased to a medium level of conductivity. The sum of the collector current of Q6 and current through R25 provides the deceleration threshold of amplifier Q7, Q8. As the wheel decelerates, current is pulled out of junction JX by C7 proportional to wheel deceleration. When the current through C7 equals the sum of current through R25 and Q6 collector, amplifier Q7 & Q8 comes out of saturation and the potential at junction J2 begins to rise, thereby producing an error or skid signal at junction J2 and thus driving Q6 toward cutoff. As Q6 is driven towards cutoff, the current supplied to JX is reduced to a final value limited to the current through R25. This action, as will be discussed later, provides for a reduced discharge rate of the voltage across C7.

If at the time a skid signal is apparent at junction J2 of the described circuit for wheel 20 there is not a similar skid signal apparent at the corresponding junction J2' of the other wheel circuit in card 2 (FIG. 1), the latter junction will still be at the low potential level of about 0.8 volt, and diode CR23' will be conductive due to the low potential at junction J2'. Thus the potential at junction J3 will remain low and of the order of 1.0 volt. The potential at J3 will not rise until the potentials at both of junctions J2 and J2' are high. Since the operation of the circuitry of card 2, associated with the second rear wheel, is the same as that associated with the first rear wheel and hereinbefore described, it is evident that, for a high-potential signal to be evident at junction J3, both wheels 20 and 30 must reach a condition of actual or incipient skidding.

When concurrent incipient or actual skidding at wheels 20 and 30 occurs, the potentials at junctions J2 and J2' will both be high, and the potential at junction J3 will be high. Thus the described resistor-diode combinations, with junction J3, form and operate as a logical ANd means. When the potential at J3 has thus risen to a high value of the order of 8 volts, current flows through diode CR10 and resistors R37 and R38, biasing transistor Q10 to the conductive state. The resulting current flow through resistor R39 produces a potential difference across the base-emitter circuit of power transistor Q11, biasing that component to conduct current through valve coil 180 to cause the latter to relieve the pressure of the fluid acting on the brakes of wheels 20 and 30.

As indicated, the wheels, wheel-brake applying means, brake releasing means, and the electronic circuitry comprised in the respective cards and connected to junction J3 are substantially identical in all significant operational features. Due to the presence of the logical AND means, contemporaneous or coincident incipient or actual skidding of both of the rear wheels must obtain before brake-relieving action occurs. In certain previous braking systems occurrence of a signal indicative of incipient or actual skidding of either wheel resulted in relaxation of the brakes of both of the pair of wheels. That action resulted in brake relaxation of both brake means even if that one wheel was exerting only a small fraction of the permissible braking effort. Thus, if the latter wheel were exerting only fifty percent of the maximum braking effort of which it was capable, brake relaxation of both wheels would occur when only three-fourths of the maximum possible braking effort was being exerted.

An understanding of the foregoing will be facilitated by reference to FIG. 6 showing a graphical representation of braking effort $\mu$ versus slip velocity of the wheel for three typical braking conditions. At free-wheeling or non-braking conditions, zero braking effort is exerted, as is indicated by the curves at the origin of the graph. First to be considered is the action when the roadway surface is dry, represented by the uppermost graph. As the brake means are applied with increasing force, the wheel tire contact surface creeps or slips, as distinguished from skidding, while the exerted braking effort $\mu$ increases rapidly. At either wheel, as brake pressure is further increased, the braking effort approaches and reaches a maximum at a point demarking the transition from incipient skidding to actual skidding, that is, at a point at which the tire departs from creeping over its footprint to sliding to some extent. That point is denoted by $\mu m$ on the graph and is the point of maximum braking effort of the wheel. As brake pressure is further increased, the exerted braking effort decreases as actual skidding commences and finally stops wheel rotation at a point termed lock up, as indicated.

Thus, continuing with reference to FIG. 6, in the mentioned prior art system the first wheel, here denoted by the letter A, could, during increase of brake application, be braked to maximum $\mu m$ as indicated by the arrow from A on the graph. Meanwhile, the second wheel B could be exerting much less than the maximum braking effect as is indicated at B on the graph, or about 50% of its maximum value $\mu m$. At that stage, the prior art system would initiate and commence relaxation of both brakes even though only about three-fourths of the maximum possible braking effort of both wheels was being exerted.

In the invention system, a considerable increase of effective total braking effort is attained by requiring both wheels to reach the maximum braking effort condition, before brake relaxation is initiated. Thus, for example, assuming wheel A reached the maximum braking effort point $\mu m$ first, as braking pressure is increased, brake relaxation is not yet initiated, but is deferred. Further increase of brake pressure brings wheel B to the point of maximum effort, $\mu m$, as indicated by B' on the graph. At that stage of braking, the slip velocity of wheel A has increased beyond incipient skidding and the braking effort has fallen off somewhat, as is indicated at point A' on the graph. With wheel A thus having been braked beyond the point of incipient skidding at $\mu m$, and wheel B having been braked to the point of maximum braking effort, the logical AND circuit responds to the concurrent signals at J2 and J2', and the relaxation of the brakes of both wheels is initiated by the previously described means and method. In accord with the principle and operation just described, an increase of effective braking effort is attained represented by the bracket bearing legend Inc in FIG. 6.

The means for withholding brake relaxation until both wheels have reached the point of maximum braking effort, with one wheel possible having been braked beyond that point, is in the exemplary form here disclosed an electronic circuit arrangement effective to perform as a logical ANd device. It will be understood that other forms of logical AND devices or arrangements may be used, for example, a fluidics AND apparatus.

By means of the described circuitry and the spin-up rate switch unit 150, the system automatically varies the brake-relieving and subsequent reapplication of brakes in accord with the condition of the roadway surface, thus considerably further improving the braking action and effectiveness over that possible with the prior art systems. As is evident to those skilled in the art, as is indicated by the three graphs in FIG. 6, the maximum possible braking effort of either wheel under wet-pavement conditions is less than that obrainable when the pavement is dry. Similarly, maximum braking effort possible under icy-pavement conditions is still lower. As is evident and inherent, the rapidity with which the brake relaxation will occur depends upon the rapidity with which incipient or actual skidding of both wheels is reached. That condition obviously will be reached sooner under icy-pavement conditions than if the pavement is merely wet and earlier under wet-pavement conditions than if the pavement were dry. By the action of the spin-up rate detection in circuit unit 150 and subsequent activation of reference control transistors Q6 in 160, the rate and time of reapplication of pressure to the brake means at the wheels is governed by the rate of spin-up or acceleration of the wheel which recovers most rapidly or first following brake-relieving action, as will be presently explained.

The rate of change of the D. C. Potential at J1, as a result of rotational acceleration and deceleration of the associated wheel, is reflected in the rate of change of charge on capacitor C6 and C7. The conduction threshold at which transistor Q6 commences and terminates conduction is variable. As is evident, recovery of high potential at J1 following a skid is faster in the event the pavement is dry, slower if the roadway is wet, and slower if the surface is icy, since the coefficient of friction upon which spin-up or recovery of rotational speed of the wheel is dependent is greatest when the pavement is dry and least when the surface is icy. Thus, following a skid, switching transistor Q9 turns off more readily whenever junction J1 re-attains its normally high potential faster, due to dry-pavement and faster wheel spin-up conditions. Likewise, Q9 is slower in turning off if the pavement is wet, and still slower if it is icy. Reapplication of brake means awaits decay of the current flow through the valve coil 180, which awaits spin-up return of the signal at J3, which controls turn off at Q9.

Thus, the system senses and is responsive to widely varying pavement conditions. The different actions are graphically illustrated in FIG. 7 in which the ordinate represents wheel speed and the abscissa represents time. As braking increases, deceleration exceeds the reference deceleration determined by the current supply to capacitor C7 through R25 and Q6 and transistors Q7 and Q8 came out of saturation to become active at point D, at which time transistor Q6 commences to become non-conductive. Capacitor C7 thus ceases to function as a differentiating capacitor and begins to function as a coupling capacitor with the potential across C7 representing a declining velocity reference. As the skid cycle continues or progresses and at the point in time denoted by E, Q6 becomes non-conductive reducing the current supplied to JX to a level limited by R25; Q7 and Q8 have been driven to cut off; and, when both wheels have reached the incipient-skid condition, the brakes are relieved. The dotted line extending through E, F and G indicates the change of potential and decreased rate of decline thereof across capacitor C7 representing a velocity reference declining at such reduced rate during the period while transistor Q6 is nonconductive. Capacitor C7, hence, now functions in conjunction with associated transistors Q7 and Q8 as a comparison means for comparing wheel speed with a declining velocity reference since Q7 and Q8 will not again become conductive until the wheel speed potential at J1 equals the reference velocity potential across capacitor C7. At the point in time denoted by G and under dry roadway surface conditions, Q9 becomes nonconductive at a predetermined spin-up rate and Q6 becomes highly conductive which greatly increase the current supplied to JX creating a decay slope of inreased rate of decline through G, H. At point H, Q7 and Q8 become conductive thus commanding brake pressure reapplication for a dry surface condition.

If the pavement is wet, Q9 turns off or becomes nonconductive and Q6 become conductive, at the time indicated by point 1, and at the time indicated by point J, Q7 and Q8 become conductive and the brakes are reapplied. For the icy pavement, Q9 remains conductive and Q7 and Q8 do not again become conductive until the time indicated by point K has been reached.

In a further detailed explanation of the operations of the circuitry, it may be noted that resistor R24 supplies the saturation current for transistor Q9. As the potential at J1 falls incident to the rapid wheel deceleration at incipient skidding, charging current stored in C6 tends to drive Q9 further into saturation. Following brake relaxation and as the potential at J1 is rising, the current at C6 reverses in direction, and when that current equals the current through R24, Q9 goes out of saturation and toward cutoff. Thus Q9 is rate sensitive. As Q9 becomes nonconductive, the Q9 collector potential drops, causing drop of potential applied to the base of Q6, thus causing the latter transistor to conduct and supply more current into the base circuit of transistors Q7 and Q8 serving to speed up onset of conduction by those transistors and decay of the brake signal with consquent onset of reapplication of the brakes. The points in time at which brake reapplication occurs for respective roadway surface conditions are represented by H, J, and K in FIG. 7.

The rate of spin-up is determined by the current through R24, the higher the current value the greater being the spin-up rate. As is evident, transistors Q7 and Q8 become non-conductive at a predetermined rotational deceleration rate determined by the sum of the currents through R25 and the Q6 collector current. The time at which Q7–Q8 become non-conductive is when the current out of C7 equals the sum of the R25 current and the Q6 collector current. At that time the potential at the emitter of Q8 rises and brake-release is initiated by the signal at J2, assuming concurrent similar electrical action in card 2. As indicated previously, concurrent incipient or actual skidding of both wheels must occur to initiate brake release or relaxation.

The valve device 100 (FIG. 1) which is controlled by the signal produced at junction J3 which drives Q10, Q11 when both of junctions J2 and J2' are at high potential, is shown in detail in FIG. 3.

The operation of valve device 100 is controlled by the above described electronic circuitry, which operates solenoid valve 180 to control the pressure differential across a diaphragm effective to change the volumetric capacity of the closed hydraulic fluid lines to the rear wheel brakes. Normally valve 180 is de-energized to close off the vent to the atmosphere so that the engine intake manifold maintains a low pressure on both sides of diaphragm D by reason of ports 132P and bleed port 132F. Upon a demand for rear wheel relaxation by the electronic circuitry, solenoid valve 180 is energized, venting one side of diaphragm D quickly to atmosphere whereby shifting the diaphragm to the right as well as cutting off and then expanding the brake end of the rear wheel brake circuit. The structure for performing these operations will now be described in fuller detail.

When the master brake cylinder of control unit 60 is activated by the vehicle operator depressing the brake pedal 60L (FIG. 1), fluid under pressure is supplied from unit 60 through conduit 60c to the intake passage 134I (FIG. 3) of device 100. When pressure reaches a determined value, as 50 psi, piston 134P is forced downwardly in opposition to spring 134S, and seats valve plate 134Z on gasket 132D thereby shutting off possible flow of air through pots 132P. Device 100 is now "armed" and opening of solenoid valve SV incident to excessive wheel deceleration permits air at atmospheric pressure to enter the very small chamber now present above diaphragm D forcing the diaphragm to the right. This action takes place in opposition to main spring 32S as the brake fluid pressure extends piston 134F and maintains plate 134Z seated on valve seat 132D. This extension of piston 134P permits ball valve 134B to seat and close the passage of fluid from inlet port 134I via conduits 20c and 30c to the wheel brake cylinders of wheels 20 and 30 and maintains the normal operability of the front brakes. The described extension of plunger 134F materially increases the volume of the brake fluid lines downstream from the closed ball valve 134B. Further supply of fluid to the rear wheel brakes is not only terminated but concurrently, some of the trapped fluid previously supplied is free to flow back into the enlarged chamber 134C with the result that the fluid pressure applied to the rear wheel brake means is effectively reduced and braking thereat reduced if not relieved. By proper proportioning the cavity or chamber 134C and the size of piston 134P in correlation with the extent of diaphragm movement, the relief of braking action is such as to permit the excessively decelerating wheel or wheels, in the event of concurrent incipient or actual skidding of both, to reduce its deceleration to a value below the noted threshold or predetermined maximum permissible value.

Following such reduction of the rate of rotational deceleration of the two rear wheels, and incident thereto, the aforedescribed electronic circuitry responds by reducing the brake relieving signal to the point where the latter fails to effectively energize the solenoid of the valve 130 and the latter re-closes. Air present to the left of the diaphragm quickly flows through pots 132D and bleed port 132F and is evacuated into the engine manifold via conduit 90. Hence, equalized vacuum conditions are quickly restored on both sides of the diaphragm.

Since both solenoid valve 130 and diaphragm device VD are very fast acting, the entire cycle of brake-relieving action can occur in a very brief interval of time, and can be effected repetitively many times per second to provide maximum effective braking action.

Exemplary values and characteristics of significant electrical components comprised in the circuitry are set out in Table I below.

| CR1 | IN645  | R1 | 27 ohms  | C1 | 150mfd |
|-----|--------|----|----------|----|--------|
| CR2 | IN756A | R2 | 120 ohms | C2 | .001mfd |
| CR3 | IN914  | R3 | 100 K ohms | C3 | .015mfd |
| CR4 | IN914  |    |          | C4 | 1.0 mfd |
| CR5 | IN970  |    |          | C5 | 0.1 mfd |
| CR6 | IN645  | R6 | 510 ohms | C6 | 4.7 mfd |
| CR7 | IN914  |    |          | C7 | 22mfd |
| CR8 | IN914  | R8 | 10 K ohms |    |       |
| CR9 | IN914  | R9 | 1 K ohms |    |       |
| CR10 |       |    |          |    |       |
|     |        | R12 | 3.9 K ohms |  |       |
| CR22 | IN914 |    |          |    |       |
| CR23 | IN914 | R14 | 9.1 K ohms |  |       |
| Q1  | 2N930  | R16 | 56 K ohms |   |       |
| Q2  | MPS6519 |   |          |    |       |
| Q3  | MPS6519 | R18 | 1.5 K ohms | |       |
| Q4  | 2N3900 | R19 | 100 ohms |   |       |
| Q5  | 2N2605 |    |          |    |       |
| Q6  | 2N2605 |    |          |    |       |
| Q7  | 2N930  | R22 | 3.9 K ohms |  |       |
| Q8  | 2N2605 |    |          |    |       |
| Q9  | 2N2605 | R24 | 110 K ohms |  |       |
| Q10 | 2N3417 | R25 | 750 K ohms |  |       |
| Q11 | MJE371 |    |          |    |       |
|     |        | R28 | 5.1 K ohms |  |       |
|     |        | R29 | 11 K ohms |   |       |
|     |        | R30 |          |    |       |
|     |        | R32 | 20 K ohms |   |       |
|     |        | R33 | 10 K ohms |   |       |
|     |        | R34 | 120 K ohms |  |       |
|     |        | R35 | 10 K ohms |   |       |
|     |        | R36 | 2 K ohms |    |       |
|     |        | R37 | 10 K ohms |   |       |
|     |        | R38 | 10 K ohms |   |       |
|     |        | R39 | 3 K ohms |    |       |
|     |        | R40 | 100 ohms |    |       |

While the particular automotive vehicle brake control system herein shown and disclosed in detail is fully capable of attaining the objects and providing the advantages hereinbefore stated, it is to be understood that it is merely illustrative of the presently preferred embodiment of the invention.

What is claimed is:

1. An anti-skid brake control system for a vehicle having brake-controlled wheels, comprising:
   wheel speed signal generating means associated with at least one of said wheels for producing a signal representative of wheel speed;
   comparison means for comparing the deceleration of said wheel speed signal with a predetermined deceleration reference for generating an error signal when the deceleration of said wheel speed signal sufficiently exceeds said predetermined deceleration reference, and then comparing said wheel speed signal with a declining velocity reference for terminating said error signal when said wheel speed signal exceeds said declining velocity reference;
   reference control means responsive to said error signal to reduce the rate of decline of said velocity reference;
   spin-up detection means responsive to said wheel speed signal for modifying the action of said reference control means to increase the rate of decline of said velocity reference when said wheel speed signal increases at a rate in excess of a predetermined spin-up rate; and
   brake control means adapted to respond to said error signal to modify braking action.

2. An anti-skid brake control system for a vehicle having brake-controlled wheels, comprising:
   wheel speed signal generating means associated with at least one of said wheels for producing a signal representative of wheel speed;
   comparison means including capacitor circuit means operative during wheel deceleration for differentiating said wheel speed signal and comparing said differentiated signal with a predetermined deceleration reference for generating an error signal when said differentiated signal sufficiently exceeds said predetermined deceleration reference, said capacitor circuit means then being operative to compare said wheel speed signal with a declining velocity reference for terminating said error signal when said wheel speed signal exceeds said declining velocity reference;

spin-up detection means responsive to said wheel speed signal for increasing the rate of decline of said velocity reference when said wheel speed signal increases at a rate in excess of a predetermined spin-up rate; and brake control means adapted to respond to said error signal to modify braking action.

3. An anti-skid brake control system for a vehicle having brake-controlled wheels, comprising:

analog signal producing means associated with at least one of said wheels for producing an analog signal as a function of wheel rotation;

comparison means including capacitor circuit means operative during wheel deceleration for differentiating said wheel speed signal and comparing said differentiated signal with a predetermined deceleration reference for generating an error signal when said differentiated signal sufficiently exceeds said predetermined deceleration reference, said capacitor circuit means then being operative to compare said wheel speed signal with a declining velocity reference for terminating said error signal when said wheel speed signal exceeds said declining velocity reference;

reference control means supplying current to said capacitor circuit for establishing said predetermined deceleration reference and responsive to said error signal to reduce the rate of decline of said velocity reference by reducing the current supplied to said capacitor circuit means; and brake control means adapted to respond to said error signal to modify braking action.

4. The invention defined in claim 3 further comprising:

spin-up detector means responsive to said wheel speed for increasing the rate of decline of said velocity reference when said wheel speed signal increases at a rate in excess of a predetermined spin-up rate.

5. An anti-skid brake control system for a vehicle having brake controlled wheels, comprising:

wheel speed signal generating means associated with at least one of said wheels for producing a signal representative of wheel speed;

comparison means includng capacitor circuit means operative during wheel deceleration for differentiating said wheel speed signal and comparing said differentiated signal with a predetermined deceleration reference for generating an error signal when said differentiated signal sufficiently exceeds said predetermined deceleration reference, said capacitor circuit means then being operative to compare said wheel speed signal with a declining velocity reference for terminating said error signal when said wheel speed signal exceeds said declining velocity reference;

reference control means including first and second current sources supplying current to said capacitor circuit means for establishing said predetermined deceleration reference and means responsive to the generation of an error signal to terminate the supply of current to said capacitor circuit by one of said first and second current supplies so as to reduce the rate of decline of said velocity reference; and brake control means adapted to respond to said error signal to modify braking action.

6. The invention defined in claim 5 further comprising:

spin-up detection means responsive to said wheel speed signal for modifying the action of said reference control means to increase the rate of decline of said velocity reference by re-establishing the supply of current to said capacitor circuit by both said first and second current sources when said wheel speed signal increases at a rate in excess of a predetermined spin-up rate.

7. In an anti-skid brake control system which includes wheel speed generating means associated with at least one wheel for producing a signal representative of wheel speed and brake control means for modifying braking action, the combination therewith comprising:

comparison means including capacitor circuit means operative during wheel deceleration for differentiating said wheel speed signal and comparing said differentiated signal with a predetermined deceleration reference for generating an error signal when said differentiated signal sufficiently exceeds said predetermined deceleration reference, said capacitor circuit means then being operative to compare said wheel speed signal with a declining velocity reference for terminating said error signal when said wheel speed signal exceeds said declining velocity reference; and reference control means supplying current to said capacitor circuit for establishing said predetermined deceleration reference and responsive to said error signal to reduce the rate of decline of said velocity reference by reducing the current supplied to said capacitor circuit means.

8. The invention defined in claim 7 further comprising:

spin-up detector means responsive to said wheel speed for increasing the rate of decline of said velocity reference when said wheel speed signal increases at a rate in excess of a predetermined spin-up rate.

9. In an anti-skid control system which includes wheel speed generating means associated with at least one wheel for producing a signal representative of wheel speed and brake control means for modifying braking action, the combination therewith comprising:

comparison means including capacitor circuit means operative during wheel deceleration for differentiating said wheel speed signal and comparing said differentiated signal with a predetermined deceleration reference for generating an error signal when said differentiated signal sufficiently exceeds said predetermined deceleration reference, said capacitor circuit means then being operative to compare said wheel speed signal with a declining velocity reference for terminating said error signal when said wheel speed signal exceeds said declining velocity reference; and reference control means including first and second current sources supplying current to said capacitor circuit means for establishing said predetermined deceleration reference and means responsive to the generation of an error signal to terminate the supply of current to said capacitor circuit by one of said first and second current supplies so as to reduce the rate of decline of said velocity reference signal.

10. The invention defined in claim 9 further comprising:

spin-up detection means responsive to said wheel speed signal for modifying the action of said reference control means to increase the rate of decline of said velocity reference by re-establishing the supply of current to said capacitor circuit by both said first and second current source when said wheel speed signal increases at a rate in excess of a predetermined spin-up rate.

* * * * *